United States Patent

[11] 3,533,340

| [72] | Inventor | Albert Macovski<br>Palo Alto, California |
|------|----------|------------------------------------------|
| [21] | Appl. No. | 647,063 |
| [22] | Filed | June 19, 1967<br>Continuation-in-part of Ser. No. 466,547,<br>June 24, 1965, now abandoned |
| [45] | Patented | Oct. 13, 1970 |
| [73] | Assignee | Stanford Research Institute,<br>Menlo Park, California,<br>a corporation of California |

[54] PHOTOGRAPHIC CODING-DECODING SYSTEM
6 Claims, 15 Drawing Figs.

[52] U.S. Cl. .................................................. 95/12.2,
95/36, 350/162, 340/173, 355/64
[51] Int. Cl. ...................................................... G03b 33/14
[50] Field of Search .......................................... 95/12.20;
340/173; 350/162; 95/36; 355/64

[56] References Cited
UNITED STATES PATENTS

| 2,050,417 | 8/1936 | Bocca............................ | 352/45 |
| 3,312,955 | 4/1967 | Lamberts ....................... | 340/173 |

*Primary Examiner*—John M. Horan
*Attorneys*—James Todorovic and Samual Lindenberg and Arthur Freilich ABSTRACT: There has been described, in the parent application, a spatial filter that has the property that when it is placed adjacent to a sensitized material, such as panchromatic film of the type used in black and white photography, that the different colors of light passing through that filter onto the sensitized material are encoded. Thereafter, the developed transparency made from the exposed sensitized material has light projected therethrough. The light passing through the transparency may be focused at a focal plane at which there are presented three sets of diffracted images which may be permitted to pass through the mask and then superimposed to form a colored reproduction of the original scene which was photographed.

Patented Oct. 13, 1970 3,533,340

INVENTOR.
ALBERT MACOVSKI
BY Lindenberg & Freilich
ATTORNEYS

Patented Oct. 13, 1970

3,533,340

INVENTOR.
ALBERT MACOVSKI
BY Lindenberg & Freilich
ATTORNEYS

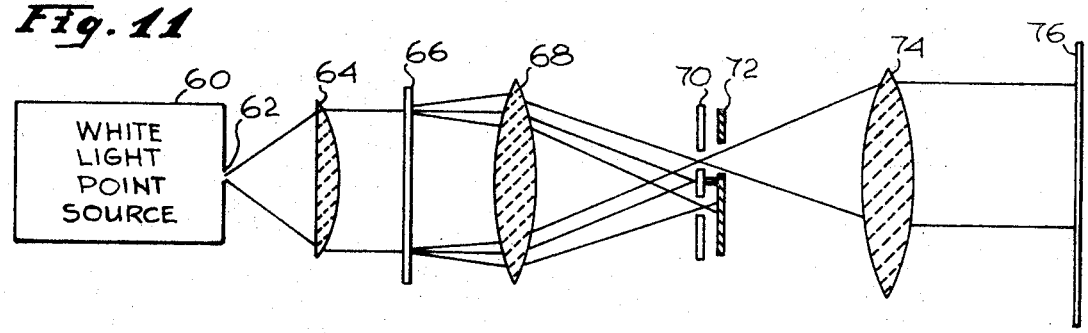
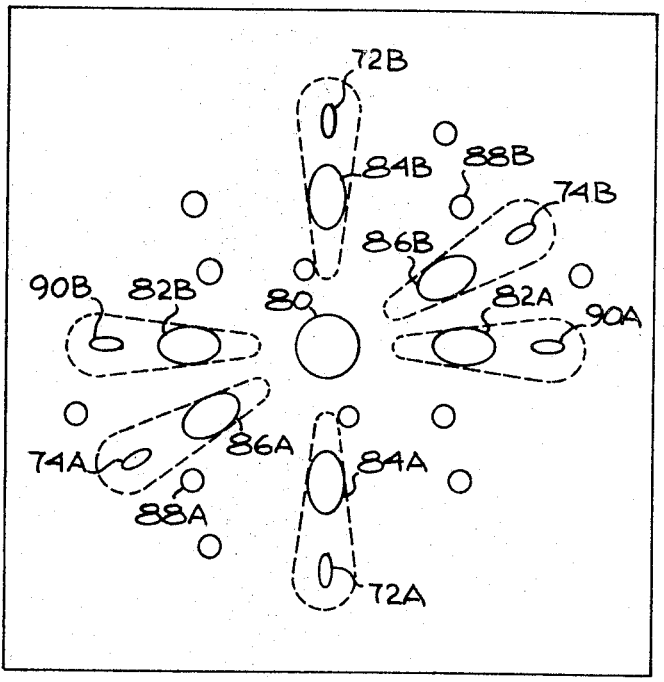
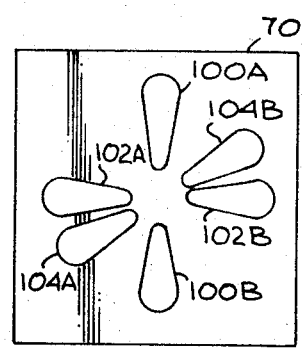
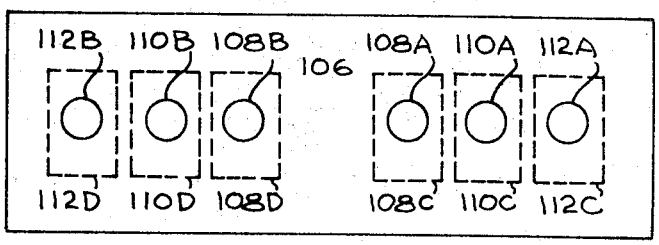
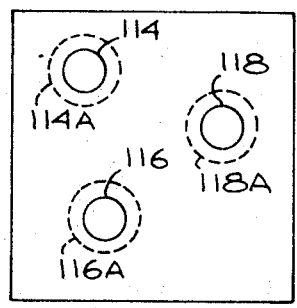
INVENTOR.
ALBERT MACOVSKI

PHOTOGRAPHIC CODING-DECODING SYSTEM

This application is a continuation in part application of application Ser. No. 466,547, filed June 24, 1965 entitled "Photography Using Spatial Filtering" by this inventor. That application was abandoned in favor of application Ser. No. 651,077 filed Apr. 28, 1967 now abandoned.

This invention uses the encoding capability of the spatial filter for recording different data bearing documents, for example, on a sensitized material wherein either the documents are of different colors, or the ink on the different documents is of a different color, or light filters are used to provide a different color light for each document.

Thereafter, the developed transparency has light projected therethrough. This light is then focused at a focal plane at which there is present a different diffracted image for each color encoded by the spatial filter. A mask may be used with a single pair of openings, which is then moved to pass therethrough at each different position, one of the diffracted images corresponding to one of the documents which was recorded. Alternatively a mask having a set of holes for each one of the diffracted images may be employed, and a second mask with a single opening is then used to cover all but one of the openings. The second mask is rotated to uncover each one of the openings in the first mask, whereby each one of the documents stored on the single transparency may have its image separated out.

BACKGROUND OF THE INVENTION

This invention relates to a method and means for data storage and retrieval using photographic techniques.

DESCRIPTION OF THE PRIOR ART

One of the known properties of a parallel line diffraction grid or grating is that this grating is illuminated from one side by a point source of light, and if a lens is arranged on the other side of the grating numerous images of the point source of light, instead of a single image, will appear on a screen which is disposed at the focus of the lens. All of these various images are aligned perpendicularly to the lines of the grating and are symmetrical to a central image. The central image can be considered as the nondiffracted or low frequency image, while the images on either side of the central image are of the diffracted images. If the grating is rotated so that its lines are 90° with respect to their original position, the images on either side of the central image rotate to assume a position 90° to the direction of the parallel lines of the grid and its rotated position.

Advantage of this phenomenon is taken in an arrangement described in a patent to Bocca, Reissue No. 20,748. As described therein, in order to record all the information in a color photograph on a single black and white negative in a manner so that the color photograph may be reconstructed from the black and white negative, there are first prepared three partial negatives of the subject, which are made by projecting an image of a colored photograph, for example, through three different colored filters, onto three separate negatives. From each of these three negatives, three corresponding diapositives are printed.

The patentee then makes a print on a monochrome or black and white negative from the red diapositive through a parallel monochrome line grating with the line being considered horizontal. Thereafter, on the same negative a print is made from the green diapositive through a parallel line grating with the lines being inclined 60° to the left of horizontal. Finally, the third diapositive is made by printing on the same black and white negative through the parallel line grating with the lines being inclined 60° to the right of horizontal.

In order to print the image recorded on the negative, the patentee illuminates the negative from one side and places an objective lens on the other side, which focuses the light passing therethrough at a plane. Three sets of images may be discovered placed along three different directions in that plane, which has in common a central image. The three images which are of the three diffracted images are formed along lines perpendicular to the direction of the lines of the grating with which the respective images were formed. Color filters are inserted in the focal plane of the lens which are constructed to provide proper color to each of the respective diffraction images in accordance with the color from which the diffracted image was derived. The colored images are then permitted to fall upon a sensitized emulsion whereby the original photograph is reproduced.

While the patented process described permits the encoding and recording of multiple images on a single sensitized surface, still, the process which must be gone through for recording is rather tedious, requiring lengthy development and processing and is costly in materials.

OBJECTS AND SUMMARY OF THE INVENTION

An object of this invention is to provide an improved method and means for encoding and recording on a single sensitized surface a plurality of data documents.

Another object of the present invention is to provide an improved photographic data storage and retrieval system.

These and other objects of the present invention may be achieved, in one arrangement by placing a spatial filter, in accordance with this invention in a camera adjacent to the sensitized material upon which a color image is to be photographed. As an example, one spatial filter may be composed of spaced grids of lines, one grid being horizontal, a second superimposed grid being relatively vertical, and a third superimposed grid being at an angle to the others. Each one of the grids of lines may be of the same or of a different color. On a single sensitized emulsion surface there may be photographed as many different data documents as there are grids of lines in the spatial filter. However, where a different color for each grid of lines is used, each one of the data documents must be a different color or must be photographed through a different color filter or may use a different color ink.

Alternatively, a spatial filter may be employed using single grid of parallel lines which are of one color for photographing a first document of one color or through one color filter onto a sensitized surface. For photographing the succeeding documents on the single emulsion surface, successive spatial filters are placed adjacent to the same sensitized surface which have differently oriented grids of lines which are of different colors, and the documents being photographed are also of different colors.

In order to reproduce the documents which have been photographed, the sensitized surface is developed to provide a transparency. A point source of light is used to illuminate the transparency through a lens. In the focal plane there is placed a mask, which may have a single aperture, or the mask may have an aperture for each one of the diffraction grids or grids of lines, and a second mask may be placed adjacent thereto with a single opening, said second mask being moveable to enable the single opening to be successively brought into alignment with the openings in the first mask. By exposing a single opening, only one of the encoded data documents will be displayed on a screen upon which the light coming through the opening in the mask which is projected onto a plane by means of another lens. By either rotating the single hole mask or by successively unblocking the openings in the multiple hole mask, the various data documents may be selectively displayed.

The novel features that are considered characteristic of this invention are set forth with particularity in the appended claims. The invention itself, both as to its organization and method of operation, as well as additional objects and advantages thereof, will best be understood from the following description, when read in connection with the accompanying drawings.

BRIEF DESCRIPTION OF THE DRAWINGS

FIG. 11 illustrates a projection system for retrieving the data stored on a single sensitized surface;

FIG. 12 illustrates a diffraction pattern;

FIGS. 13, 14 and 15 illustrate the kinds of masks which may be used with the arrangement shown in FIG. 11.

DESCRIPTION OF THE INVENTION

FIGS. 1 through 5 and FIGS. 12, 13, 14 and 15 are the same as FIGS. 1 through 5 and 7, 8, 9 and 10 in the parent application from which this invention is divided out. These drawings and the description thereof are being reproduced herein in the interest of completeness of the explanation.

Figure 1:
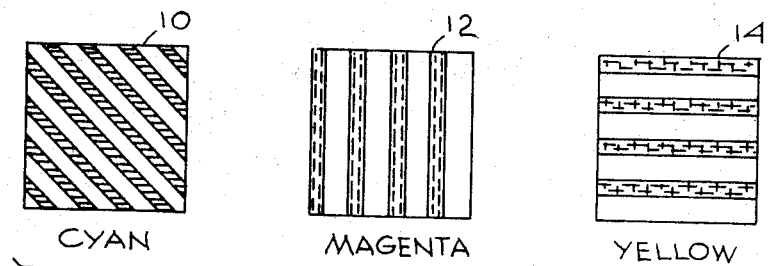
FIG. 1 illustrates the three grids which are used in one spatial filter.
Figure 2:
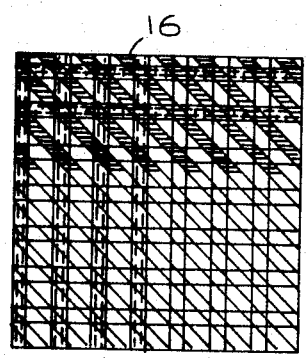
FIG. 2 illustrates a spatial filter with the three grids shown in FIG. 1, superimposed on one another.

FIG. 1 illustrates, by way of example, three different grids or line gratings, 10, 12 and 14, which are superimposed to make a tartan of three superimposed rulings to provide, as shown in FIG. 2, a spatial filter suitable for use herein. Each grid has its own angular orientation and the lines of the respective grids, 10, 12 and 14 are each in color, which may be selected to be the negative primaries, cyan, magenta and yellow. The tartan in FIG. 2 is supported on a transparent sheet and is termed a spatial frequency encoder 16.

Figure 3:
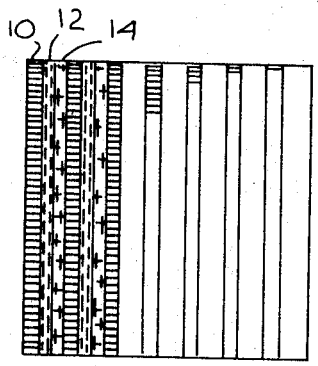
FIGS. 3 and 4 illustrate other spatial filter arrangements which may be employed for encoding data documents in accordance with this invention.

FIG. 3 represents another arrangement for a spatial frequency encoder suitable for use with this invention. Here the three grids of parallel lines respectively 13, 15 and 17 have different numbers of lines per inch, or considered another way, the grids have different frequencies. These grids are superimposed on one another with the lines parallel to one another.

Figure 4:
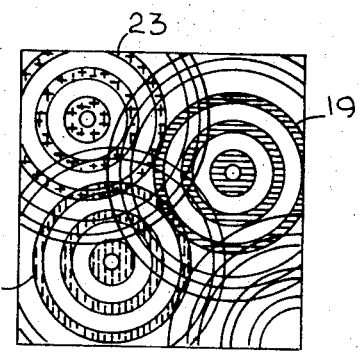

FIG. 4 illustrates another form for a spatial filter 16. It comprises three Fresnel lens zones 19, 21 and 23, the rings of which are respectively cyan, magenta and yellow. The lens zones may be positioned relative to one another in any convenient manner, the one shown being merely exemplary.

Figure 5:
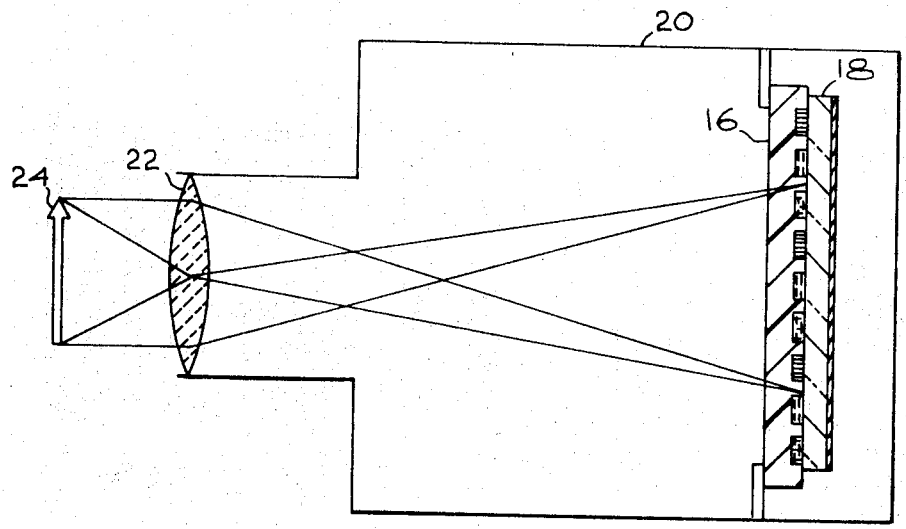
FIG. 5 is a schematic illustration of a camera equipped with a spatial filter.

FIG. 5 shows an arrangement for employing a spatial filter for taking a color photograph. This arrangement is also suitable for encoding and recording data documents in accordance with this invention. As shown in FIG. 5, a conventional still or motion picture camera is modified by inserting the filter 16 directly in front of the sensitized sheet of material 18 within the camera 20. The sheet of sensitized material may either be panchromatic film or a sheet of thermoplastic material having a photoconductive layer on the surface adjacent to the filter, in order to provide a recording which has thickness variations as contrasted to the type of recording one gets with a photographic emulsion.

The lens 22 focuses the object 24 being photographed on the sensitized material in the customary manner. Here the object being photographed is a document bearing data. In order to record successive documents on the same sensitized surface, using a spatial filter, of the types shown in FIGS. 2, 3 or 4, each successive data bearing document must either be of a different color, or must have the ink with which the data is of a different color, or a different colored light filter must be inserted in front of the camera lens 22 for each different document being photographed on the same sensitized surface. Alternative to using a single spatial filter with the superimposed grids or Fresnel zones, one may employ a succession of spatial filters, each one having a single set of lines or zones of one color for recording a succession of data documents, each being of a different color or being photographed through a different colored light filter, with a single sensitized surface.

Figure 6:
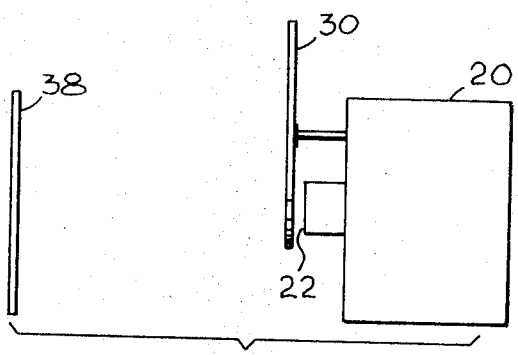
FIG. 6 illustrates how the camera may be equipped with a color filter wheel to enable the recordation of multiple documents on a single sensitized surface where a spatial filter is employed made up of a plurality of grids.
Figure 7:
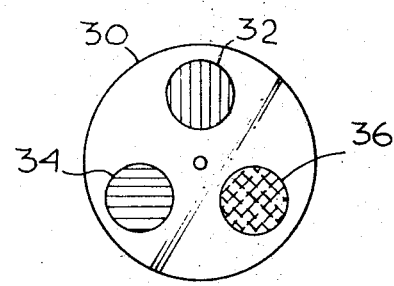
FIG. 7 is a plan view of the rotatable filter means shown in FIG. 6.

FIG. 6 shows an arrangement whereby this may be accomplished. The camera 20 has a rotatably supported wheel 30 attached to the front thereof. As shown in FIG. 7, the wheel 30 has three openings therein for supporting three different colored light filters respectively 32, 34 and 36. These are exemplified as a red, blue and yellow filter, respectively. The document 38 is positioned in front of the lens 22. For each different document to be recorded on a single emulsion, the wheel is rotated to bring a different colored light filter in front of the lines.

Figure 8:
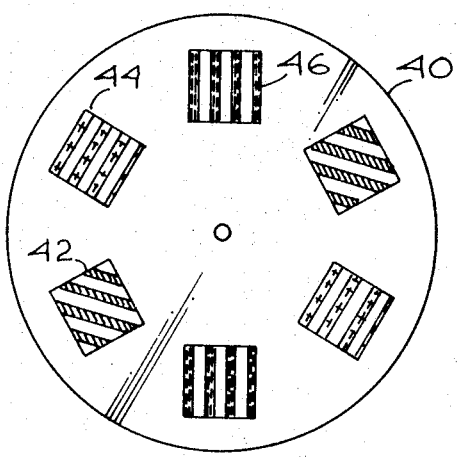
FIG. 8 illustrates a spatial filter wheel which may be inserted into a camera or encoding successive data documents for recordation on a single sensitized surface.
Figure 9:
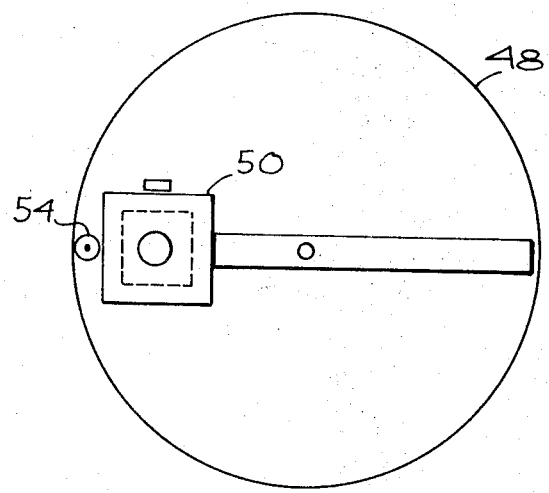
FIGS. 9 and 10 illustrate a front and sectional view of a camera equipped with the spatial filter wheel shown in FIG. 8.
Figure 10:
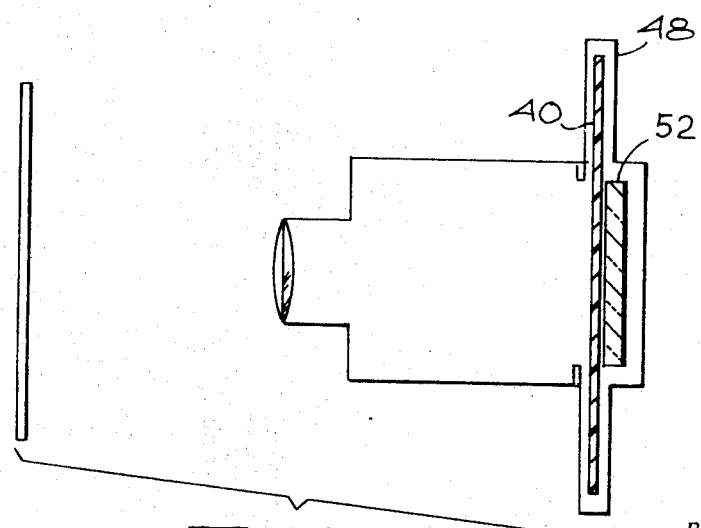

FIGS. 8, 9 and 10 show another arrangement for recording a plurality of different data bearing documents on a single sensitized surface. Instead of using a single spatial filter having a multiplicity of grids or zones thereon, a plurality of spatial filters are employed, respectively 42, 44 and 46, each one of which has a single grid of lines of a different color thereon as exemplified in FIG. 1, and each one of which is mounted within a wheel. The wheel 40 is supported within a housing 48, which in turn is attached to a camera 50. The wheel is rotatable within the housing in order to enable each one of the spatial filters to be successively brought into position adjacent to the sensitized surface 52, and between it and the lens at the front of the camera. A rotatably supported knob 54 which has its periphery in contact with the periphery of the wheel 40 is rotated to bring each one of the successive spatial filters into position in front of the sensitized surface for each different picture to be take. Any suitable means, well known in the art, may be employed for indexing the successive spatial filters.

As previously indicated, each document to be recorded should be of a different color, or may have different colored ink, or a different colored light filter may be employed.

Where the recording medium is a thermoplastic material which has a photoconductive layer on the surface, the camera will make provision for charging or applying a potential across the thermoplastic material whereby the resultant recording comprises thickness variations responsive to the light variations. Where the sensitized surface is panchromatic film, after a conventional processing, a positive transparency is made by developing in manners well known in the art. The effect on the final transparency resulting from a recording in the manner described is as follows. The images of red objects (which are shown as grey on the transparency) have superimposed on them the fine grid of line shadows oriented at the angle (if any) of the cyan ("minus red") lines of the filter. This result is due to cyan dye being opaque to red light while magenta and yellow dyes are transparent. Similarly, green and blue portions of the scene record as grey with superimposed line shadows oriented at the angles of the magenta ("minus green") and yellow ("minus blue") lines of the filter, respectively. The spaces between the dark lines have grey scale densities appropriate to the brightness of the object photographed. Colors (e.g., yellow, purple, white, etc.) which are additive combinations of the foregoing primaries, become encoded with superimposed gratings that are additive combinations of the colors of the appropriate primaries. The Fresnel lens type spatial filter provides three images corresponding to the three Fresnel zones with rings on them, the cyan zone placing rings on the red image, the magenta zone placing rings on the blue image, and the yellow zone placing rings on the green image.

In the case of the thermoplastic material, it is left with plastic deformations proportional to the light intensity across the surface thereof, with the result that the photographic information is recorded as phase gratings.

In order to achieve maximum seperability, when a plurality of documents are sought to be reproduced, in the case of the angularly superimposed grids, the angles made by the lines of the three grids relative to one another are selected such that desired diffracted images fall within regions of the negative which are clearly separable from the other regions of the negative on which the undesired cross product or higher order diffracted images fall. For example, one grid will have its lines horizontal, another grid will have its lines vertical, and the third grid will have its lines making an angle of 30° with the horizontal grid lines. In the case of the nonangularly superimposed grid, the frequencies of the grid lines determine the amount of separation of the diffracted images. For the Fresnel zone filter, the separation of the zones determines the separability of the images.

FIG. 11 shows an arrangement for a projection system capable of providing a separation, or a retrieval, of the plurality of data documents which are recorded on a single sensitized surface. This projector has a bright white point light source 60, established by passing the light through a pinhole opening 62 to a collimating lens 64. The light then passes through the transparency 66, which carries the encoded recorded data documents. The light which passes through the transparency is then focused by a lens 68 in the plane of an aperture of mask 70. A second mask 72, having a single opening, may be employed where the aperture of mask 70 is of the type having a plurality of openings. The single opening is successively aligned with each aperture of the mask 70. The light which passes through the mask is then focused by a projection lens 74 upon a viewing screen 76. The image on the viewing screen is that of one of the data documents which are recorded on the transparency 66.

FIG. 12 illustrates the diffraction pattern which is obtained if a screen is placed at the location of the aperture mask 70 when a spatial filter using angularly superimposed grids of lines is used to take a photograph. Due to the line or phase grating present in the transparency 66, light rays passing through it are bent or diffracted so that in the plane of the mask one would not only have a bright central spot 80, that is the undiffracted image of the pinhole opening 62, but one would also have three pairs of "satelite spots", respectively, 82A, 82B, 84A, 84B, 86A and 86B. Each such pair is oriented symetrically about the center spot and is located along an axis normal to the direction of one of the sets of lines in the transparency.

In addition, there is found in the plane of the aperture mask 70, six more pairs of fainter spots, typically 88A, and 88B, which are formed from light diffracted by arrays of intersections of the three original gratings with one another. (Still more spots, 90A, 90B, etc., are formed by second order diffraction, but they are normally faint enough to be ignored).

The useful light is that derived from the first order diffracted image respectively, 82A, 82B, 84A, 84B, 86A and 86B, and also that of the higher order diffracted image, such as 90A and 90B, which is sufficiently strong to be useful. The other images which are derived from the cross product are not used. The dotted lines shown in FIG. 12 indicate the location for apertures in the mask 70, which would pass only the useful light to the following screen.

FIG. 13 represents a mask 70 having apertures 100A, 100B, 102A, 102B, 104A, 104B, which are disposed in a manner to pass therethrough only the light from the useful diffracted images. This light is black and white and the projection lens 50 can produce a clear black and white image on the screen 76. The central image 80 is blocked. The secondary mask 72 has a pair of openings therein which may be positioned to pass therethrough the light from openings 100A and 100B at any given instance, and to block the light from the other openings. The mask can then be rotated to pass therethrough, the light from openings 102A and 102B, and thereafter the light from openings 104A and 104B. In this manner, when three superimposed documents have been stored on the single transparency, the three documents may be separately retrieved and either recorded by placing a recording medium at the location of the screen, or may be read by looking at the screen.

It will be obvious that instead of using two masks, 70 and 72, one mask such as 72 may be used, which can be rotated to select one pair of diffracted light images. FIG. 14 illustrates the first order diffraction image which is obtained when a spatial filter of the type shown in FIG. 3 is used. The bright undiffracted central spot 106 is present, and is blocked out, plus a pair of "satelite spots" for each grid. The more lines in a grid (or the higher the frequency), the greater the angle of diffraction of the spots associated with that grid. Thus, the spots 108A and 108B represent the diffracted image due to lines of one color and at one frequency, the two spots 110A and 110B represent the diffracted image due to a second color set of lines of a set of frequency, and the spots 112A and 112B represent the diffracted image obtained by a third set of lines at a third frequency and color.

The dotted rectangles respectively 108C, 108D, 110C, 110D, 112C, 112D, represent the apertures which may be cut in the mask which may be used for decoding. A second mask may be used with an arrangement for uncovering the two spots of the diffracted image corresponding to a single document. Alternatively, a mask may be employed with a flap arrangement, whereby a pair of openings corresponding to a single document may only be opened at one time.

FIG. 15 shows the first order diffraction image which is obtained when a spatial filter of the type shown in FIG. 4 is used. Three easily discernible bright spots are provided, respectively, 114, 116, and 118, one for each Fresnel zone. The dotted line circles, respectively, 114A, 116A and 118A, represent the holes required for permitting only the light from these spots to pass through the decoding mask. It will be obvious that the suitable arrangement for permitting light corresponding to only one spot at a time, to pass through the mask may be simply provided for. The advantage of the Fresnel zone spatial filter is that the resulting image spots have relatively large separations, thus enabling the use of relatively large light sources for the projection system. However, the sensitized films employed for the filter must have a very high film resolution to achieve reasonable focal lens. While the projection system shown in FIG. 11 illustrates the projection of a single transparency, it will be appreciated that this can constitute motion picture film which is moved through a film gate to be sequentially exposed in a manner well known to the art. As each frame of the motion picture film is projected, the mask is correspondingly actuated to expose one pair of holes at a time to successively display the data documents stored on the transparency. Any of the presently known indexing techniques for enabling a search and retrieval of stored documents may be employed. This may include photographing an identifying code at the time the document is photographed, or prearranging the sequence of documents stored in a numbered sequence and numbering the film sequences, etc. Should it be desired to reproduce a document in color, then a colored light filter may be placed in the opening of the mask which produces the diffracted image desired to be colored.

From the foregoing it should be appreciated that there has been described and shown herein a novel and useful arrangement for storing a plurality of data documents on a single sensitized surface, and coding them in the process of photographing them onto a sensitized surface in a manner so that they may be readily separated and retrieved. It should be appreciated that the description herein of the encoding photographic process for storage of the documents indicates the use of a plurality of grids of lines or diffraction gratings, each of which has a different color. One may perform the encoding process using a diffraction grating wherein the lines are black and using a different relative angular disposition of these lines for each document photographed. The reading of each document from the resulting transparency may be performed in accordance with the invention. That is, a mask having a pair of holes oriented at 90° to the direction of a grid of lines is required for each document photographed through a grid on that transparency.

I claim:

1. A method of photographing a plurality of documents onto a single sensitized surface, comprising positioning a spatial filter adjacent to said sensitized surface, said spatial filter having a plurality of diffraction gratings thereon, the lines of each diffraction grating being of a different color and passing light of all colors but one color, the spaces between the lines passing light of all colors, photographing each document successively onto said sensitized surface through said spatial filter, and making the light from each document which reaches said sensitized surface have a different color.

2. A method for recording the information on a plurality of different documents on a single sensitized surface, comprising successively positioning each one of a plurality of diffraction gratings adjacent said sensitized surface, each one of which has lines which pass light of all but one color and the spaces between the lines passing light of all colors, photographing a different one of said data documents through each of said successively positioned diffraction gratings onto said single sensitized surface and, causing information bearing light from each document to be of a different color.

3. A method for recording a plurality of different documents on a single sensitized surface as recited in claim 2 wherein each one of the successively positioned diffraction gratings is positioned with the lines of the grating at a different angle relative to the lines of the previously positioned grating.

4. The method of reproducing separately each of a plurality of data documents which are recorded on a transparency made by photographing successively each one of said data documents onto a sensitized surface through a diffraction grating for each different one of said documents, said method comprising directing light from a source at one side of said transparency, focusing the light passing through said transparency at a predetermined focal plane, whereby a plurality of pairs of light images displaced from one another are provided in said focal plane, each of said pairs of light images including the data on a different one of said plurality of data documents, preventing the light from all but one of said pairs of light images to pass through said focal plane, and displaying the pair of light images passed through said focal plane whereby a data document is displayed.

5. The method as recited in claim 4 wherein the step of preventing the light from all but one pair of light images to pass through said focal plane, includes positioning a mask at said focal plane having a pair of holes disposed for passing therethrough, the pair of light images corresponding to a single document, and moving said mask to successively position said pair of holes to successively pass therethrough the light from the plurality of pairs of light images.

6. The method as recited in claim 4 wherein the step of preventing the light from all but one pair of light images to pass through said focal plane includes positioning at said focal plane a mask having a pair of holes for each pair of light images disposed for passing each said pair of light images, and blocking in succession all but one pair of said holes to successively display each of said documents recorded on said transparency.